United States Patent [19]

Macedo et al.

[11] Patent Number: 5,678,236
[45] Date of Patent: Oct. 14, 1997

[54] METHOD AND APPARATUS FOR ELIMINATING VOLATILES OR AIRBORNE ENTRAINMENTS WHEN VITRIFYING RADIOACTIVE AND/OR HAZARDOUS WASTE

[75] Inventors: Pedro B. Macedo, Bethesda, Md.; Ian L. Pegg, Alexandria, Va.; Hamid Hojaji, Bethesda, Md.; Robert K. Mohr, Washington, D.C.; Marek Brandys, Bethesda, Md.

[73] Assignees: Pedro Buarque De Macedo, Bethesda; Theodore Aaron Litovitz, Annapolis, both of Md.

[21] Appl. No.: 589,252

[22] Filed: Jan. 23, 1996

[51] Int. Cl.⁶ .................... G21F 9/00; C03B 5/16
[52] U.S. Cl. .................... 588/11; 588/251; 588/252; 65/27; 65/134.6; 65/134.8; 110/345
[58] Field of Search .................... 588/11, 16, 251, 588/252, 201; 65/134.8, 27, 134.6; 110/345

[56] References Cited

U.S. PATENT DOCUMENTS

| Re. 15,727 | 12/1923 | Crossley . | |
|---|---|---|---|
| 1,069,255 | 8/1913 | Heroult . | |
| 1,394,973 | 10/1921 | Crossley . | |
| 1,454,082 | 5/1923 | Schlosser . | |
| 1,822,705 | 9/1931 | Mambourg . | |
| 2,254,079 | 8/1941 | McAlpine . | |
| 2,274,643 | 3/1942 | Adams . | |
| 2,531,612 | 11/1950 | Crochet et al. . | |
| 2,880,456 | 4/1959 | Kuzela et al. | 65/142 X |
| 3,025,385 | 3/1962 | Tanaka | 219/50 |
| 3,161,600 | 12/1964 | Barton . | |
| 3,232,731 | 2/1966 | Malicheff | 65/27 |
| 3,293,017 | 12/1966 | Jenkins | 65/122 |
| 3,321,409 | 5/1967 | Grover et al. | 252/301.1 |
| 3,397,972 | 8/1968 | Brichard et al. | 65/27 |
| 3,573,940 | 4/1971 | Cockrell et al. . | |
| 3,647,405 | 3/1972 | Smith | 65/19 |

(List continued on next page.)

FOREIGN PATENT DOCUMENTS

| 54-136596 | 10/1979 | Japan | 65/19 |
|---|---|---|---|
| 244358 | 12/1925 | United Kingdom . | |

OTHER PUBLICATIONS

Mechanical Engineering, Sep. 1988, pp. 70–75, "Hazardous Waste: Where to Put It? Where Will It Go?", Sather.

*Primary Examiner*—Ngoclan Mai
*Attorney, Agent, or Firm*—Jacobson, Price, Holman & Stern, PLLC

[57] ABSTRACT

In this invention radioactive or hazardous containing materials are vitrified in a melter having two or more chambers. Glass feed materials are added to the primary chamber of the melter and they are heated to a molten glass which is then transported to one or more secondary chambers where hazardous and/or radioactive containing materials are added and are encapsulated and/or melted. In addition, the non-plutonium part of a glass feed can be melted in a non-radioactive environment which permits contact operations and maintenance; no radioactive shielding; and a conventional off gas system-similar to commercial vitrification plants. The hot molten "clean" glass is directed into a radioactive containment such as a "glove box"; shielded "glove box"; or hot cell, or a combination of these. By delivering hot "clean" glass from a melter including non-radioactive materials, 90% of the off gases will be non-radioactive. Thereby only minimum heating is needed in the radioactive containment resulting in very significant reductions in size of the maintenance requirements for the radioactive portion of the process. In the radioactive portion, the glove box will include means for adding plutonium feed. The glass melt will be homogenized with the plutonium feed, optionally by additional stirring. Once the plutonium glass is sufficiently homogeneous, it can be cooled in the container in the glove box or the container becomes a disposal container for the glass. If the melt chamber is different than the container, the melt is discharged to a separate container, all within the glove box, for subsequent disposal.

22 Claims, 3 Drawing Sheets

U.S. PATENT DOCUMENTS

| | | | |
|---|---|---|---|
| 3,811,860 | 5/1974 | Nier | 65/178 X |
| 3,869,232 | 3/1975 | Ruus et al. | 264/5 |
| 3,880,629 | 4/1975 | Dulin et al. | 65/27 |
| 3,907,956 | 9/1975 | Meunier | 264/117 |
| 3,942,966 | 3/1976 | Kroyer et al. | 65/33 |
| 3,956,076 | 5/1976 | Powell et al. | 65/21.2 X |
| 3,960,532 | 6/1976 | Lazet | 65/22 |
| 3,966,456 | 6/1976 | Ellenbaum et al | 75/41 |
| 3,976,829 | 8/1976 | Wiebke et al. | |
| 3,998,619 | 12/1976 | Cerutti et al. | 65/136 |
| 4,019,888 | 4/1977 | Verhappen et al. | 65/135 |
| 4,020,004 | 4/1977 | Schulz et al. | 252/301.1 |
| 4,029,489 | 6/1977 | Froberg et al. | 65/136 |
| 4,030,905 | 6/1977 | Hawkins | 65/135 |
| 4,036,625 | 7/1977 | Holmes et al. | 65/134 |
| 4,055,390 | 10/1977 | Young | 423/14 |
| 4,065,281 | 12/1977 | Byrne | 65/19 |
| 4,065,282 | 12/1977 | Morey | 65/28 |
| 4,087,285 | 5/1978 | Kurz | 65/134 X |
| 4,097,401 | 6/1978 | Guber et al. | |
| 4,110,097 | 8/1978 | Chevallier et al. | 65/136 |
| 4,139,360 | 2/1979 | Piper | 65/134 |
| 4,191,546 | 3/1980 | Kroyer | 65/20 |
| 4,224,177 | 9/1980 | Macedo et al. | 252/301.1 |
| 4,225,332 | 9/1980 | Tsay | 65/134 |
| 4,284,514 | 8/1981 | Wright | 210/221 |
| 4,297,304 | 10/1981 | Scheffler et al. | 264/0.5 |
| 4,299,611 | 11/1981 | Penberthy | 65/27 |
| 4,309,204 | 1/1982 | Brooks | 65/28 |
| 4,313,747 | 2/1982 | Barton | 65/27 |
| 4,321,075 | 3/1982 | Ilk et al. | 65/27 |
| 4,325,693 | 4/1982 | Ackermann et al. | 432/195 |
| 4,346,661 | 8/1982 | Nakamura | 110/259 |
| 4,353,725 | 10/1982 | Hohman et al. | 65/27 |
| 4,376,070 | 3/1983 | Pope et al. | 252/629 |
| 4,385,918 | 5/1983 | Dunn et al. | 65/27 |
| 4,414,013 | 11/1983 | Connell | 65/136 X |
| 4,422,862 | 12/1983 | Wardlaw | 65/28 |
| 4,424,149 | 1/1984 | Bege et al. | 252/629 |
| 4,433,995 | 2/1984 | Toussaint | 65/135 |
| 4,439,108 | 3/1984 | Hojaji et al. | 65/22 |
| 4,468,473 | 8/1984 | Drolet et al. | 501/155 |
| 4,514,851 | 4/1985 | Dunn | 373/27 |
| 4,528,014 | 7/1985 | Heimerl | 65/142 |
| 4,536,205 | 8/1985 | Krumwiede et al. | 65/135 |
| 4,544,396 | 10/1985 | Krumwiede et al. | 65/178 |
| 4,545,800 | 10/1985 | Won et al. | 65/134 |
| 4,582,521 | 4/1986 | Froberg | 65/27 |
| 4,588,568 | 5/1986 | Pollmann et al. | 423/244 |
| 4,600,425 | 7/1986 | Krumwiede et al. | 65/178 |
| 4,624,003 | 11/1986 | Eirich et al. | 373/120 |
| 4,627,069 | 12/1986 | Harvey et al. | 373/29 |
| 4,632,690 | 12/1986 | Colwell et al. | 501/155 X |
| 4,634,461 | 1/1987 | Demarest et al. | 65/27 |
| 4,635,570 | 1/1987 | Ewest et al. | 65/27 X |
| 4,660,211 | 4/1987 | Stritzke | 373/36 |
| 4,666,490 | 5/1987 | Drake | 65/134 X |
| 4,678,493 | 7/1987 | Roberts et al. | 65/134 |
| 4,696,691 | 9/1987 | Lawhon et al. | 65/27 |
| 4,718,931 | 1/1988 | Boettner | 65/29 |
| 4,735,784 | 4/1988 | Davis et al. | 423/111 |
| 4,764,216 | 8/1988 | Hooykaas | 501/155 X |
| 4,775,495 | 10/1988 | Izumida et al. | 252/628 |
| 4,782,497 | 11/1988 | Sasaki et al. | 373/29 |
| 4,809,294 | 2/1989 | Daudin et al. | 373/41 |
| 4,820,325 | 4/1989 | Wheeler | 65/27 |
| 4,820,328 | 4/1989 | Roberts et al. | 65/134 |
| 4,821,653 | 4/1989 | Jones | 110/229 |
| 4,831,943 | 5/1989 | Aune | 110/346 |
| 4,855,082 | 8/1989 | Duivelaar | 252/629 |
| 4,858,537 | 8/1989 | Priebe et al. | 110/243 |
| 4,895,678 | 1/1990 | Ohtsuka et al. | 252/632 |
| 4,898,692 | 2/1990 | Rajan et al. | 252/629 |
| 4,906,409 | 3/1990 | Leister | 252/629 |
| 4,915,039 | 4/1990 | Ringel | 110/346 |
| 4,944,785 | 7/1990 | Sorg et al. | 65/136 |
| 4,948,411 | 8/1990 | Pieper et al. | 65/342 |
| 4,956,158 | 9/1990 | Nguyen et al. | 423/111 |
| 4,957,527 | 9/1990 | Hnat | 65/19 |
| 4,974,529 | 12/1990 | Benoit et al. | 110/346 |
| 4,977,837 | 12/1990 | Roos et al. | 110/165 A |
| 4,988,376 | 1/1991 | Mason et al. | 65/134 |
| 4,997,485 | 3/1991 | Lamoni | 65/21.3 X |
| 5,004,706 | 4/1991 | Dickinson | 501/27 |
| 5,022,329 | 6/1991 | Rackley et al. | 110/234 |
| 5,024,822 | 6/1991 | Hittner et al. | 423/111 |
| 5,027,722 | 7/1991 | Schwyter | 110/259 |
| 5,032,161 | 7/1991 | Pieper et al. | 65/335 |
| 5,035,735 | 7/1991 | Pieper et al. | 65/134 |
| 5,041,398 | 8/1991 | Kauser et al. | 501/27 |
| 5,052,312 | 10/1991 | Rackley et al. | 110/346 |
| 5,078,065 | 1/1992 | Tsunemi et al. | 110/259 |
| 5,096,692 | 3/1992 | Ek | 423/659 |
| 5,133,267 | 7/1992 | Kent et al. | 110/346 |
| 5,134,946 | 8/1992 | Poovey | 110/346 |
| 5,173,919 | 12/1992 | Schmidl et al. | 373/37 |
| 5,177,304 | 1/1993 | Nagel | 588/201 |
| 5,188,043 | 2/1993 | Trepaud | 110/346 |
| 5,191,154 | 3/1993 | Nagel | 588/201 |
| 5,202,100 | 4/1993 | Nagel et al. | 423/5 |
| 5,298,233 | 3/1994 | Nagel | 423/580 |
| 5,301,620 | 4/1994 | Nagel et al. | 110/346 |
| 5,322,547 | 6/1994 | Nagel et al. | 75/414 |
| 5,324,341 | 6/1994 | Nagel et al. | 75/403 |
| 5,354,940 | 10/1994 | Nagel | 588/201 |
| 5,358,549 | 10/1994 | Nagel et al. | 75/414 |
| 5,358,697 | 10/1994 | Nagel | 422/184 |
| 5,395,405 | 3/1995 | Nagel et al. | 48/197 R |
| 5,415,982 | 5/1995 | Wilkinson | 423/437 B |
| 5,436,210 | 7/1995 | Wilkinson et al. | 588/201 |
| 5,443,571 | 8/1995 | Wilkinson et al. | 266/46 |

METHOD AND APPARATUS FOR ELIMINATING VOLATILES OR AIRBORNE ENTRAINMENTS WHEN VITRIFYING RADIOACTIVE AND/OR HAZARDOUS WASTE

FIELD OF THE INVENTION

The present invention relates to reduction of emissions from hazardous (which includes asbestos containing materials, RCRA containing materials, TSCA containing materials and other materials found to be hazardous to health or environment) and/or radioactive glass melting, by isolating the component that is most volatile and/or dangerous from glass feed material, and adding the component in a subsequent chamber of a glass melter.

BACKGROUND OF THE INVENTION

In the vitrification process certain components of the raw materials used in the feed are exhausted in the off-gas system, in particular, elements/compounds with high vapor pressure or small particle sizes will be enriched or concentrated in the off-gases. These highly volatile species may include such elements as I, Cs, Tc and Pb, for example.

The entrained components are trapped in either a liquid or a dry emission control system. Some hazardous components combined with alkali borates or other alkali oxides, which normally leave the melter, cause the formation of sticky deposits on the filters, bags, or other dry elements within the emission control system (the "filter cake").

Adding a dry powder to the filter (known as a "filtration aid") as a release agent enables easy cleaning and prolongs the useful life of the filter. Especially useful are the common inorganic filtration aids such as, but not limited to, diatomaceous earth.

Common radioactive species such as $Cs^{137}$ and $Cs^{134}$, have a high volatility even under cold cap conditions when a layer of cold, unreacted glass forming components covers wholly or partially the molten glass surface. Typically 20% of the Cs will escape into the off-gas of the melter. If one operates with a hot cap (i.e., when hot, molten glass surface is mostly exposed), much higher losses are possible. Thus, depending on melt conditions, a fraction of the Cs content in the feed will end up on the filter cake formed in the emission control system. The Cs loss to the emission control system may vary between more than 80% for prolonged hot idling, to below 5% in the case of an extensive cold cap. Recycling of the filter material loaded with hazardous and/or radioactive deposits helps close the waste cycle. However, if some significant mount of the hazardous and/or radioactive materials escape into the off-gas, closing the loop may be difficult. Further, the concentration of certain components may be enriched in the off-gas, causing additional hazard.

In addition, there is presently considerable interest in technologies that can be used to stabilize or immobilize the considerable stockpiles of plutonium that have been accumulated as a result of national defence programs over the past several decades. This material is, in addition to being highly toxic, a fissionable material that can be used to construct thermonuclear devices. There is a pressing need to address the disposition of this material to ensure that access to it is limited for long periods of time.

The conventional way to vitrify radionuclides including radium, actinides and especially plutonium is to have a melter inside a radioactive containment and add a feed which would be a mixture of glass frit and plutonium containing materials. The problems with the conventional approach is that it is difficult to remove the melter heat from the radioactive containment. Conventional water cooling can become dangerous if leaks develop and water comes in contact with the high temperature in the melt which can cause a steam explosion. Even a small volume expansion (steam formation) can make the pressure in the radioactive containment have a positive excursion with the resultant release of plutonium powders.

SUMMARY OF THE INVENTION

In this invention radioactive or hazardous containing materials are vitrified in a melter having two or more chambers. Glass feed materials are added to the primary chamber of the melter and they are heated to a molten glass which is then transported to one or more secondary chambers where hazardous and/or radioactive containing materials are added and are encapsulated and/or melted.

Current U.S. Department of Energy standards dictate the plutonium content of glass used to vitrify plutonium to be between about 2 and 10 weight percent plutonium. Thus about 90% or more of the glass melt can be performed in a non-plutonium environment. Accordingly, by the present invention, the non-plutonium part of the glass feed can be melted in a non-radioactive environment which permits contact operations and maintenance; no radioactive shielding; and a conventional off gas system-similar to commercial vitrification plants.

The hot molten "clean" glass is directed into a radioactive containment such as a "glove box"; shielded "glove box"; or hot cell, or a combination of these. By delivering hot "clean" glass from a melter including non-radioactive materials, 90% of the off gases will be non-radioactive. Thereby only minimum heating is needed in the radioactive containment resulting in very significant reductions in size, and of the maintenance requirements for the radioactive portion of the process.

In the radioactive portion, the glove box will include means for adding plutonium feed. The glass melt will be homogenized with the plutonium feed, optionally by additional stirring. Once the plutonium glass is sufficiently homogeneous, it can be cooled in the container in the glove box or the container becomes a disposal container for the glass. If the melt chamber is different than the container, the melt is discharged to a separate container, all within the glove box, for subsequent disposal.

In the event that the plutonium glass is required to be spiked with high gamma emitters such as Cs137, the spike can be added together with the plutonium in the glove box or in a separate stage. Since cesium has a higher volatility than plutonium, it should be added last. Neutron absorbers should be added to the glass in order to assure the prevention of criticality conditions.

One approach that can be used for stabilization or immobilization of a variety of radioactive or hazardous materials, including plutonium, includes the conversion of the material to a glass form by vitrification. This would render, in the case of plutonium, access only by complex and extensive extraction processes. In addition, plutonium can be vitrified together with neutron absorbers to reduce the risk of criticality and with other radioactive materials which emit very intense and penetrating radiation (such as Cs-137 and Sr-90) that would make the handling of such materials extremely hazardous outside of defense facilities. In this way the possibility of, for example, a terrorist threat by access to this material could be reduced immensely.

However, such a vitrification process would have to be operated remotely to protect the operators and the environment. In addition, the process would have to be designed to ensure that any possibility of accumulation of plutonium in the system was eliminated since that could lead to criticality with potentially devastating consequences. The vitrification approach disclosed herein as part of the present invention would greatly reduce the size of the radioactive portion of the system and would therefore simplify and reduce the cost of both the remote operations and the isolation of the system from the environment and, in addition, would essentially eliminate the possibility of plutonium accumulations that could lead to criticality.

In an example of a first embodiment of this approach, glass forming chemicals or frit would be melted in a non-radioactive glass melting system which would not have to be either inside the containment system ("hot cell") or remotely operated. A variety of glass melting systems could be used for this purpose but an electric joule-heated system is preferred. The molten glass stream produced by this system would be introduced into the hot cell which would be maintained at a reduced pressure by a separate off-gas treatment system to ensure that leakage was inwards. Inside the hot cell, the glass stream would pour into a collection vessel where it would be combined with the radioactive materials, which may include radium, actinides and especially plutonium containing materials. For example, plutonium would be fed as a plutonium oxide powder to obtain the desired loading of about 5 to 10 weight percent in the final product; high-activity materials such as $Cs^{137}$ (for example, as a salt such as cesium nitrate) could be blended with the plutonium oxide feed to increase the radiation field around the product.

Further, neutron absorbers, such as the rare earths gadolinium, hafnium or samarium may be added to minimize criticality concerns. Also the rare earth additions have the further advantage, since their chemistry is close to that of plutonium, that their presence makes chemical recovery of the plutonium much more difficult. The rare earth neutron absorbers are preferred over another common neutron absorber, boron, because boron is easily leached from a glass, reduces the glass durability, and is easily separated from plutonium.

The molten glass stream would react with the feed materials causing a combination of fusing and chemical incorporation into the glass matrix as well as physical encapsulation. Once the collection vessel is filled to the desired level, the pour streams would be interrupted and the vessel would be replaced by an empty vessel. The filled container would be set aside to permit the molten mass inside to cool and solidify into the vitrified product. The container would then be sealed and decontaminated for storage and/or transport.

In an example of a second embodiment of this approach, an additional but considerably smaller melter system would be installed inside the hot cell. This melter would consist of an electrically heated chamber (heated by, for example, joule-heating, induction, resistance, microwave, or plasma heating) in which the non-radioactive molten glass stream would be combined with the radioactive feed materials. In this way a more complete reaction and incorporation of the radioactive constituents into the glass matrix could be achieved, if required, while maintaining the advantages inherent in this general approach.

The small melter chamber could be sized to ensure that the possibility of criticality in that vessel was eliminated. The secondary melting process would be operated in a continuous flow mode by use of either an overflow or throat through which the glass stream would pass into the collection and final storage vessel. The glass inventory at any moment in the secondary melting chamber would therefore be a very small fraction of that in the non-radioactive primary melting chamber. This results in a substantial reduction in the size of the hot cell facility that would be required in comparison to more conventional one-step vitrification processes which would make use of a large radioactive glass pool to obtain the required production rates.

In a third embodiment of the present invention, a spent filter cake, with or without the filtration aid, produced from the off-gas system of a glass melter processing material containing hazardous components is added directly into a discharge container, and then glass containing the hazardous material components is discharged into the same container. In this way:

1) The volatile components within the filter cake are exposed to melt temperature for a minimum time, resulting in minimum volatility;

2) The molten glass dissolves and/or contains the contaminated filter cake;

3) The temperature attained in the discharge container is lower than that in the melter, thus reducing volatilization;

4) One saves in both energy and melter operation time required to process filter cakes through the melter because the heat content of the molten glass, presently wasted to the surroundings, is now utilized to vitrify the filter cake. The whole process takes place during an unavoidable cool-down time period, with an added benefit of time savings due to parallel processing;

5) Since the glass melt cools relatively fast, the temperature exposure of the volatile components is much shorter than inside the melter cavity, further reducing volatilization.

Accordingly, an object of this embodiment of the present invention is the processing of a material containing hazardous components, including RCRA elements as defined by the Environmental Protection Agency in the U.S. Code of Federal Regulations, 40 CFR Part 268.4, as including Ba, Cr, Ni, Ag, Hg, Pb, Se, As and Cd, as well as asbestos, and/or radioactive components.

Another object of this embodiment of the present invention is to process the hazardous and/or radioactive waste deposits from within the off-gas system.

Still another object of the present invention is to minimize the overall hazardous and/or radioactive emissions leaving the processing facility.

A still further object of the present invention is the vitrification of plutonium. The vitrification of plutonium in a radioactive cesium-containing glass may be used for disposal of nuclear war-head material. Due to safety reasons, the total waste loading of artificial isotopes within the resulting waste form will be less than about 10 wt %. The expense of the vitrification system can be substantially reduced if the glass formers or frit are melted in a first chamber which is not a transuranic contaminated environment. Transuranic is defined as a material containing more than 100 nCi/g (nano curies/gram) of transuranic elements. As proposed, the molten, non-transuranic glass from the first chamber is discharged into a second chamber containing vitrified or other plutonium species. If desired, a material containing a highly radioactive gamma emitter such as $Cs^{137}$ is added into the second chamber, before or after discharging the non-transuranic glass into it.

DETAILED DESCRIPTION OF THE PREFERRED EMBODIMENTS

Figure 1:
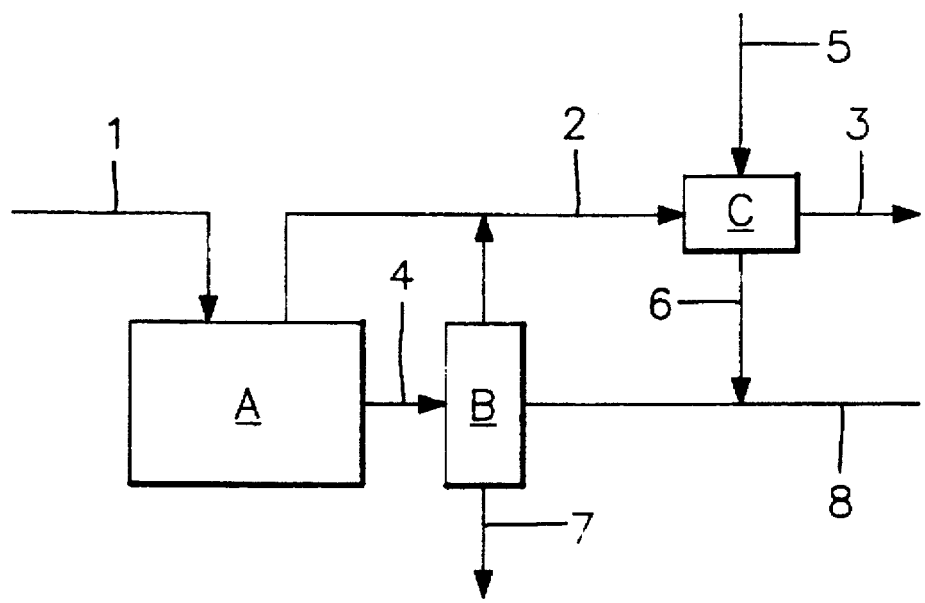
FIG. 1 is a schematic flow diagram of a glass melter containing hazardous components for encapsulating a filter cake and/or other hazardous components.

In the present invention the glass feed, pre-treated or not, including waste forms (1 in FIG. 1 or 1' in FIG. 2), is added to a main chamber of the glass melter (A or A'). The melter feed is any substance added to a glass melter to produce glass whether it constitutes a glass forming components or not. Melter feed may include frit material that has been vitrified prior to the present melt; sand and other sources of silica; alkali and alkaline metal compounds; boron; alumina; iron and other transition metals; rare earths, heavy metals such as lead, bismuth and their compounds such as oxides, hydroxides, carbonates, nitrates, sulfates and halides. The feed may be in the form of a dry powder or as a wet slurry, with or without organics. The feed may contain hazardous and/or radioactive components in the case of FIG. 1.

Upon heating, the feed will react and/or decompose becoming two streams: a glass melt (4 or 4') and an off-gas (2 or 2'). The melt (4) contains molten glass, a cold cap with partially processed feed, as well as other phases dispersed throughout the melter. Part of the hazardous and/or radioactive materials will leave the melter (only in glass melter A) in the off-gas stream (2). These hazardous and/or radioactive materials may be, in any of the three phases, gaseous, liquid and solid. The liquid droplets and solid particles are usually small and entrained in the off-gas stream.

In the present invention the off-gas stream is introduced into the emission control system (C, C') prior to release to the environment. Conventional cleansing steps may involve at least one of the following steps: quenching, where the off-gas is cooled causing vapors in the off-gas to condense; scrubbing, where the off-gas is in contact with a liquid stream (often alkali) and chemical reactions bring the hazardous and/or radioactive components into the liquid stream; mist eliminator, removes droplets of liquid from the off-gas; cyclone, removes liquid and solid particles from the off-gas; and filters, remove particles from the off-gas stream. Filters can be ceramic, metallic, organic (nylon, Teflon, etc.) where they act directly, as in the case of a bag house, or indirectly, as in the case of when the off-gas passes through a liquid scrubber, where liquid is then filtered. The hazardous and/or radioactive material is collected on a filter. In FIG. 1, filter cake (6) is the material that accumulates on the filter with or without any filtration aids or cooling materials which may have been introduced into the filter unit.

In FIG. 1, a filtration media will be added as a filter aid (5). The filter aid can improve the filtration capacity (decontamination factor) of the filter and/or improve the ability of removal of the filter cake from the filtration system.

The glass melter (A or A') of the present invention has two or more chambers. Additional chambers to the main chamber as referred to above could include a refining chamber; a forehearth; and/or a container (B or B') into which the molten glass is poured.

Figure 2:
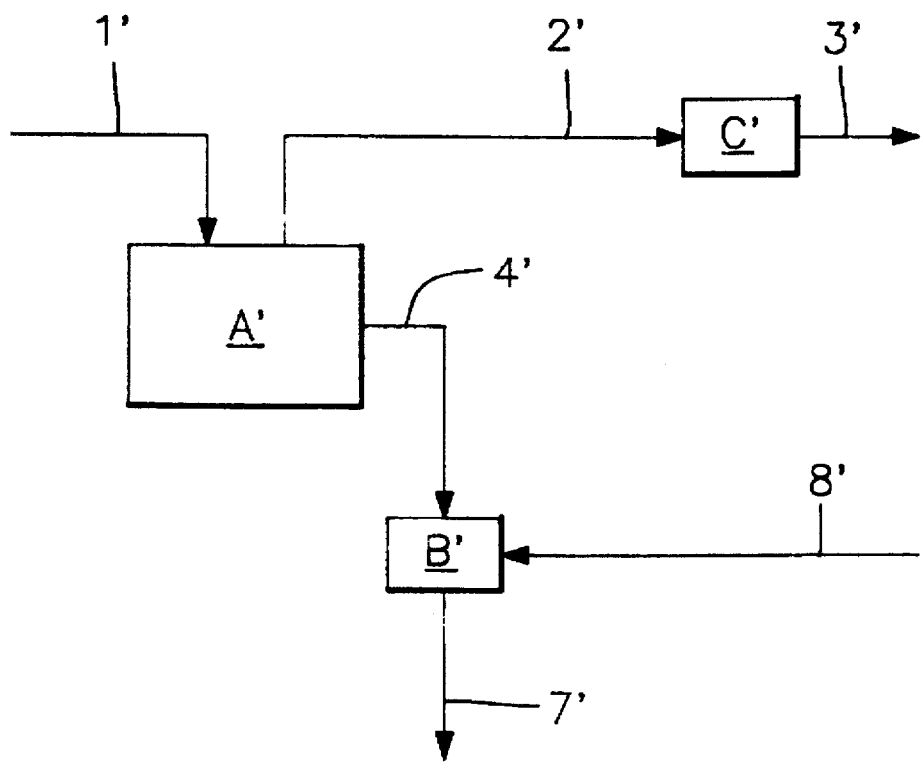
FIG. 2 is a schematic flow diagram of a glass melter for encapsulating hazardous components.

In the case of the vitrification of hazardous and/or radioactive waste using the melter (A') as shown in FIG. 2, one may discharge the clean glass from the melter (A') into a canister of the waste or to a hot cell (B') having hazardous and/or radioactive waste introduced from feed stream (8'). This canister is considered, according to the principles of the present invention, to be the second chamber of the glass melter of the present invention.

The filter cake (6) from the off-gas system (C), optionally including additives (such as fluxes), as in FIG. 1, and/or additional waste forms (8 or 8'), as in FIGS. 1 and 2, is added to the second chamber (B or B') of the glass melter. Upon contact with the molten glass, the hazardous/radioactive components of the filter cake (6) in second chamber (B) (FIG. 1) may react with the molten glass and be immobilized in a vitrified form and/or may be encapsulated by the glass melt. When the filter cake (6) is added to the forehearth (B) of the melter, the cake will be vitrified by reacting with the molten glass from melter (A). The resulting glass may be further processed, e.g., made into gems (7), frit, marbles, etc.

Where no filter cake is generated, as in FIG. 2 (for example, where Pu wastes may be vitrified), only the additives and/or waste form (8') will be added directly into a canister or to a hot cell for disposal.

Figure 3:
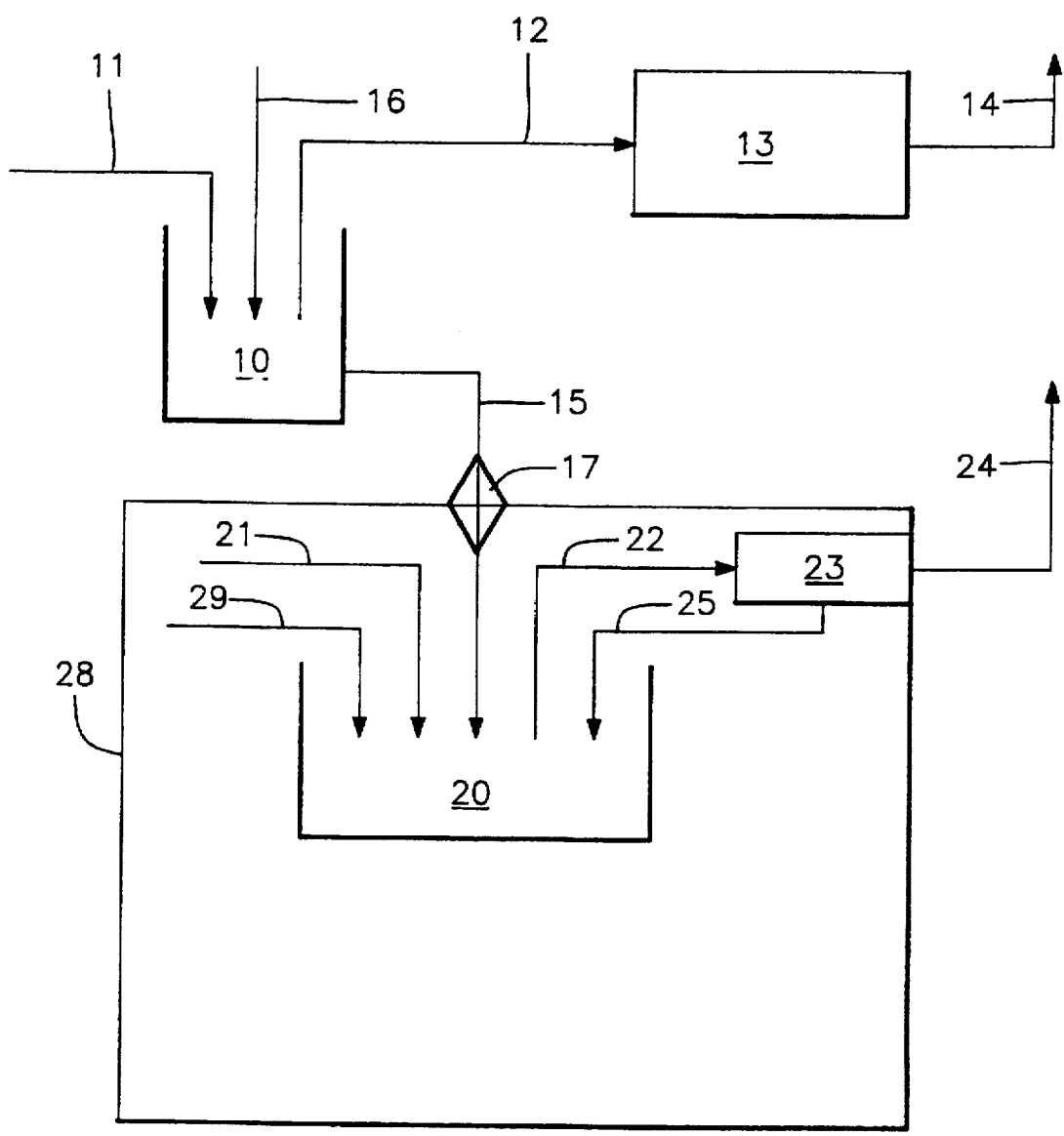
FIG. 3 and 4 are schematic flow diagrams for treating plutonium within a containment system by addition of molten glass from outside of the containment system.

In FIG. 3, the glass feed 11, which may be batch chemicals or frit (premelted glass pieces), is added to a non-plutonium melter 10, outside the plutonium containment (such as a shielded glove box) 28. The non-plutonium containing off gas 12, is processed by a non-plutonium emission control system 13, and released as clean gases 14. The non-plutonium molten glass stream 15 is introduced into the controlled environment containment 28 through a one way feed device 17 and into the plutonium contaminated secondary chamber 20. The secondary chamber 20 and containment 28 are maintained under negative air pressure. In this embodiment the chamber 20 is the disposal canister.

Plutonium containing material 21 is added to chamber 20. Off gas 22 from this operation is processed by a plutonium contaminated emissions control system 23. Once cleaned, the off gas 24 is released to the environment. The resulting filter cake, 25, may be introduced into the second chamber 20. The plutonium is prevented from potential criticality by adding neutron absorber to the glass melt. The neutron absorber can be added to the original feed 11; as a separate stream 16; as part of the plutonium stream 21; as a separate stream 29; and/or some combination of these methods.

Figure 4:
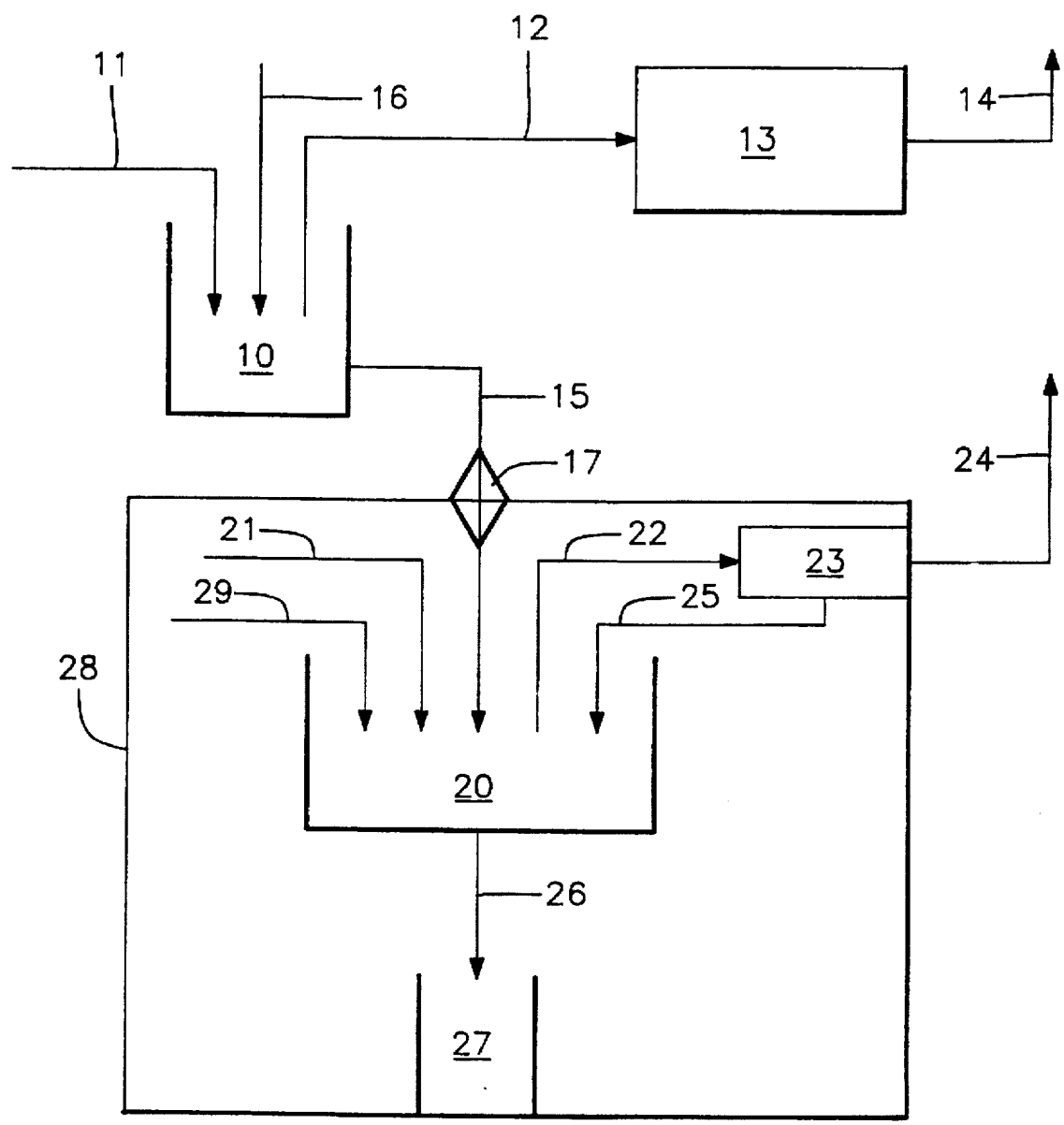

In FIG. 4, the molten glass 26 from the chamber 20 is transferred to a disposal canister 27. In canister 27, the glass is allowed to completely cool prior to transfer for disposal.

EXAMPLE 1

A waste glass melter for the vitrification of asbestos and/or hazardous waste as described in U.S. Pat. Nos. 5,188,649 and 5,340,372, herein incorporated in its entirety by reference, was prepared to vitrify asbestos containing waste and hazardous waste. The melt bath was heated to approximately 1075° C. and the glass discharge chamber was heated to approximately 1000° C. The off gas cleaning system for the melter was prepared by pulsing the baghouse filters to remove previously used diatomaceous earth pretreatment coating. Approximately 2 kg of clean diatomaceous earth was put on the filter bags as a pretreatment coating by sucking the diatomaceous earth onto the filters using a diatomaceous earth addition port. After these preparations, two bags of asbestos containing materials weighing approximately 12 kg and three packages of waste material containing hazardous components including the RCRA metals Cr, Ni, Pb, Se, and As and weighing approximately 31 kg were fed to the melter for vitrification.

After waiting approximately two hours to insure that the waste material was vitrified the reciter was prepared for glass discharge. Prior to glass discharge, the baghouse filters were pulsed to remove the diatomaceous earth contaminated during the melting of the previously described waste. The diatomaceous earth collected after the pulsing operation was discolored with dark contaminants that had been trapped during the melting operation and required disposal as secondary waste.

A five gallon pail was placed within a larger 55 gal. drum to receive glass discharged from the melter. A port was arranged in the discharge drum cover flange which would permit the introduction of contaminated diatomaceous earth into the pail as the glass was being discharged. Approximately 100 gm of contaminated diatomaceous earth was placed in a beaker for addition to the glass discharge.

Glass discharge was initiated by starting the air lift. After approximately one gallon of glass had drained into the pail, introduction of diatomaceous earth was initiated by pouring it slowly through a funnel having a long spout. Much of the diatomaceous earth was drawn beneath the glass surface as the glass filled the container while some of the diatomaceous earth floated on the glass surface. After about two more gallons of glass had been discharged, the discharge was stopped and the glass was allowed to cool for about 35 minutes. At this point the top surface of the glass in the pail was solid.

Glass discharge was again initiated using the air lift. About one gallon more of glass was discharged into the pail covering the remaining diatomaceous earth. The resulting pail of glass was then allowed to cool completely. After cooling, no diatomaceous earth was observed in the top surface of the glass in the pail.

EXAMPLE 2

In this example, a second 100 gm sample of the contaminated diatomaceous earth obtained as described in example 1 was mixed with 20 gm of borax to act as a flux to aid the fusing of the diatomaceous earth. The diatomaceous earth and borax mixture was added in the following steps.

About one gallon of glass was discharged into a clean five gallon pail and then about 50 gm of the mixture was added to the glass and the discharge was stopped for 10 minutes. Approximately two gallons of the glass was then discharged and the remaining 70 gm of the mixture was added to the glass and the discharge was stopped for about 30 minutes to allow the surface of the glass to harden in the pail. Then about 3 inches of glass was poured on top of the glass and the partially fused diatomaceous earth and borax mixture.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A process for melting glass and encapsulating radioactive components in a melter having two or more chambers, said process comprising
   adding glass feed material to a primary chamber of the melter,
   heating said feed material to molten glass,
   transporting said molten glass to one or more secondary chambers of the melter, and
   adding radioactive components to said glass melt in said secondary chamber to encapsulate the radioactive components.

2. A process for melting glass and encapsulating radioactive components as claimed in claim 1, wherein said one or more secondary chambers are located in a controlled environment containment.

3. A process for melting glass radioactive components and encapsulating radioactive components as claimed in claim 2, wherein said controlled environment containment includes a one way device through which said molten glass is transported into said one or more secondary chambers.

4. A process for melting glass radioactive components and encapsulating radioactive components as claimed in claim 1, wherein said radioactive components include actinides.

5. A process for melting glass radioactive components and encapsulating radioactive components as claimed in claim 1, wherein said radioactive components include plutonium.

6. A process for melting glass containing hazardous and/or radioactive components in a melter having two or more chambers, said process comprising
   adding feed material containing said components to a primary chamber of the melter,
   heating said feed to molten glass,
   volatilizing said components into an off-gas stream,
   capturing said components from the off-gas stream in a filter cake,
   transporting said molten glass to one or more secondary chambers of the melter, and
   adding said filter cake to said glass melt in said secondary chamber to melt and/or encapsulate the filter cake.

7. A process for melting glass containing hazardous and/or radioactive components as claimed in claim 6, wherein said filter cake includes a filter aid.

8. A process for melting glass containing hazardous and/or radioactive components as claimed in claim 7, wherein said filter aid is a powder having high silica content.

9. A process for melting glass containing hazardous and/or radioactive components as claimed in claim 8, wherein said high silica powder contains diatomaceous earth.

10. A process for melting glass containing hazardous and/or radioactive components as claimed in claim 8, wherein said high silica powder contains perlite.

11. A process for melting glass containing hazardous and/or radioactive components as claimed in claim 6, wherein said secondary chamber is a discharge container.

12. A process for melting glass containing hazardous and/or radioactive components as claimed in claim 6, wherein said secondary chamber is a forehearth.

13. A process for melting glass containing hazardous and/or radioactive components as claimed in claim 6, wherein flux is added with the filter cake.

14. A process for melting glass containing hazardous and/or radioactive components as claimed in claim 7, wherein flux is added with the filter cake.

15. A process for melting glass containing hazardous and/or radioactive components as claimed in claim 6, wherein the volatile components include Cs.

16. A process for melting glass containing hazardous and/or radioactive components as claimed in claim 6, wherein the volatile components include Tc.

17. A process for melting glass containing hazardous and/or radioactive components as claimed in claim 6, wherein the volatile components include RCRA materials.

18. A process for melting glass containing hazardous and/or radioactive components as claimed in claim 6, wherein the volatile components include TSCA materials.

19. A process for melting glass containing hazardous and/or radioactive components as claimed in claim 6, wherein the volatile components include asbestos containing materials.

20. A process for melting glass and encapsulating radioactive components in a melter having at least two chambers, said process comprising adding glass feed material to a primary chamber of the melter, heating said feed material to molten glass, transporting said molten glass to one or more secondary chambers located in a controlled environment containment having a negative air pressure, and adding said radioactive components to said glass melt in said secondary chamber to encapsulate the radioactive components.

21. A process for melting glass radioactive components and encapsulating radioactive components as claimed in claim 20, wherein said radioactive components include actinides.

22. A process for melting glass radioactive components and encapsulating radioactive components as claimed in claim 20, wherein said radioactive components include plutonium.

* * * * *